US010889339B1

(12) United States Patent
Leaveck

(10) Patent No.: US 10,889,339 B1
(45) Date of Patent: Jan. 12, 2021

(54) TRACK MODIFICATION FOR AN AUTOMOBILE

(71) Applicant: Robert J. Leaveck, Black Canyon City, AZ (US)

(72) Inventor: Robert J. Leaveck, Black Canyon City, AZ (US)

(*) Notice: Subject to any disclaimer, the term of this patent is extended or adjusted under 35 U.S.C. 154(b) by 311 days.

(21) Appl. No.: 15/979,554

(22) Filed: May 15, 2018

(51) Int. Cl.
| B62D 55/04 | (2006.01) |
| B62D 55/084 | (2006.01) |
| B62D 55/24 | (2006.01) |
| B62D 55/15 | (2006.01) |
| B62D 55/10 | (2006.01) |

(52) U.S. Cl.
CPC ........... B62D 55/084 (2013.01); B62D 55/10 (2013.01); B62D 55/15 (2013.01); B62D 55/24 (2013.01)

(58) Field of Classification Search
CPC ....... B62D 55/084; B62D 55/10; B62D 55/15
See application file for complete search history.

(56) References Cited

U.S. PATENT DOCUMENTS

| 3,606,496 | A | * | 9/1971 | Haycock | B62D 49/0635 305/143 |
| 3,689,123 | A | | 9/1972 | Barbieri | |
| 3,801,164 | A | * | 4/1974 | Mazzarins | B62D 49/0635 305/126 |
| 3,860,080 | A | * | 1/1975 | Firstenberg | B62D 55/04 180/9.1 |
| 4,448,273 | A | | 5/1984 | Barbieri | |
| 4,953,919 | A | | 9/1990 | Langford | |
| 5,240,084 | A | * | 8/1993 | Christianson | B62D 49/0635 180/9.1 |
| 5,388,656 | A | | 2/1995 | Lagasse | |
| 5,855,248 | A | * | 1/1999 | Rawson | B62D 55/04 180/9.21 |
| 7,410,225 | B1 | * | 8/2008 | Marzetta | A63H 17/14 305/159 |
| 8,613,332 | B2 | | 12/2013 | Zakuskin | |
| 2012/0211288 | A1 | | 8/2012 | Afanador | |

* cited by examiner

*Primary Examiner* — Tony H Winner
(74) *Attorney, Agent, or Firm* — Cramer Patent & Design, PLLC; Aaron R. Cramer

(57) ABSTRACT

A track system includes a track assembly wraps around an exterior of a tire of an automobile and a frame assembly. The frame assembly forms the first surface upon which the track traverses a second surface. Each lower angle of the system on opposite sides of the first surface is secured about a wheel separated by a tension bar. An interior side of the track is in mechanical communication with the tire of the automobile at an upper portion of the system. When the wheel of the tire is rotated the track is likewise rotated.

13 Claims, 6 Drawing Sheets

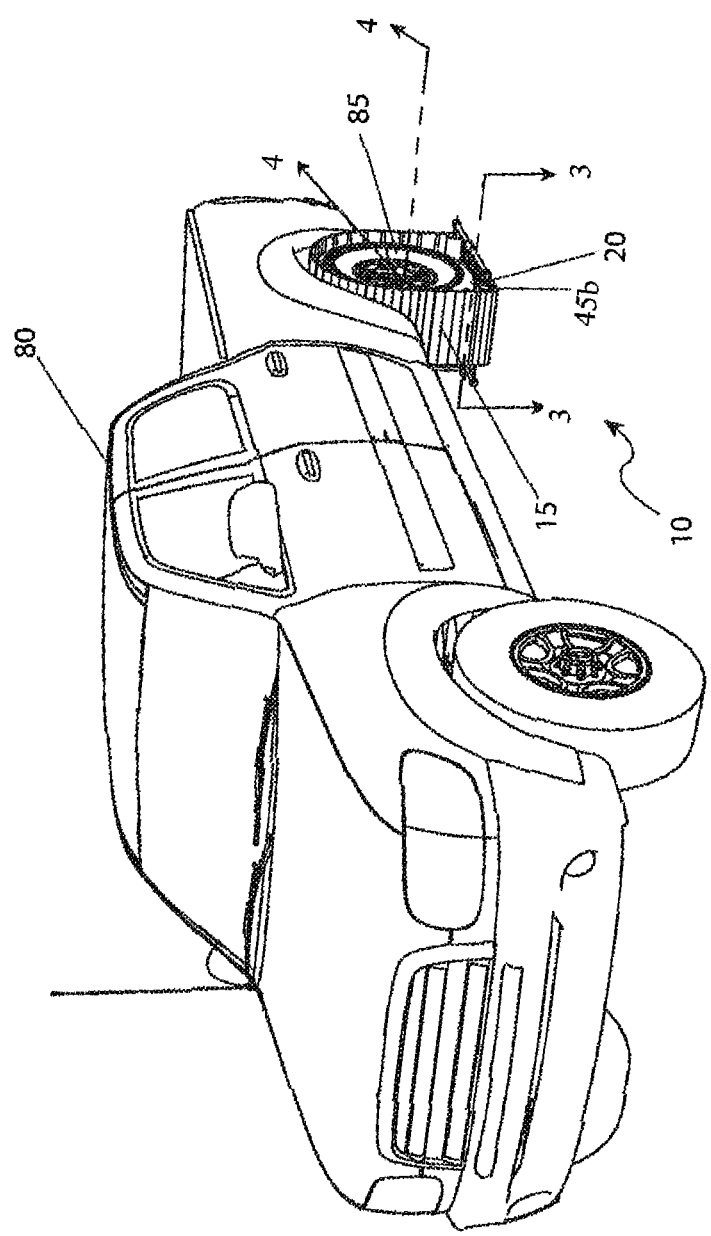

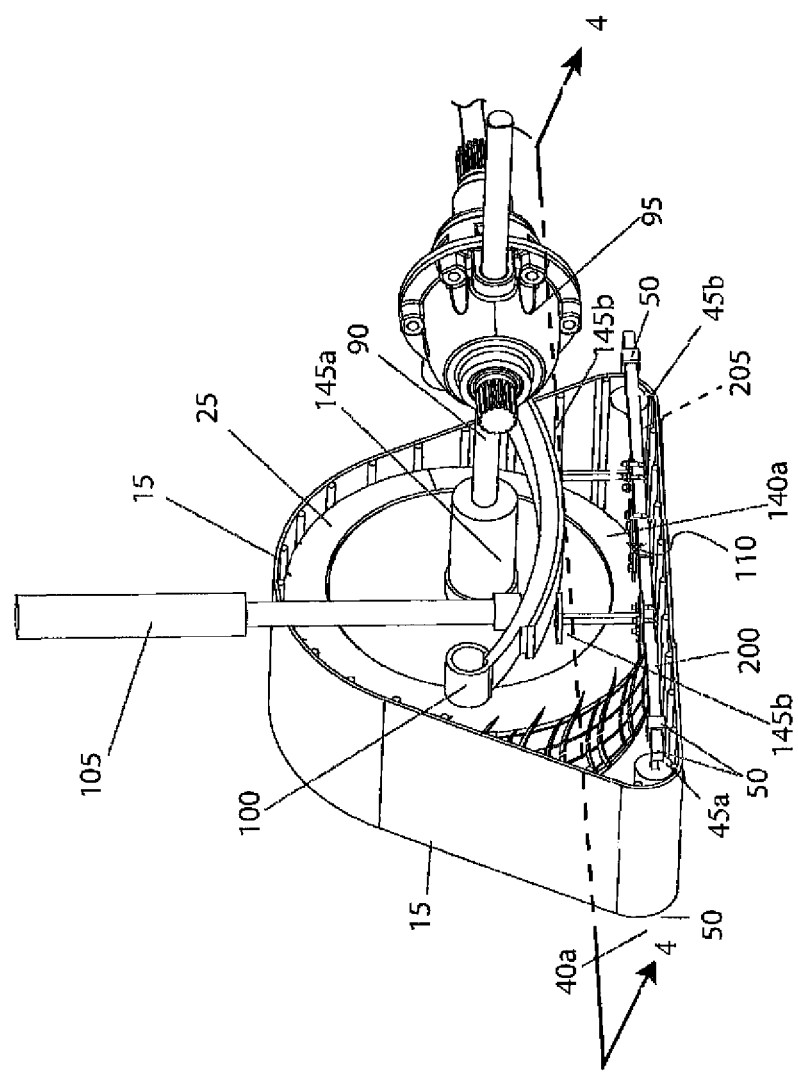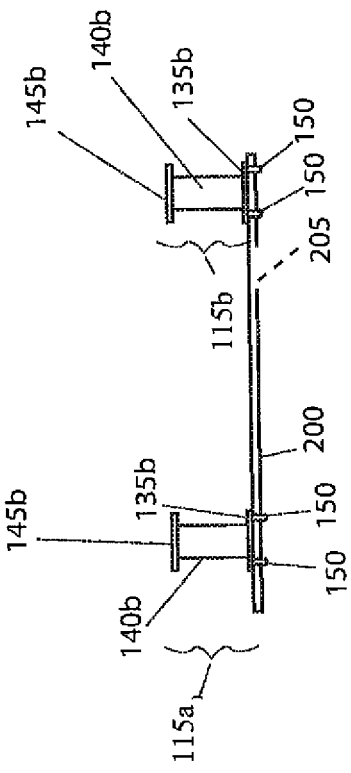

TRACK MODIFICATION FOR AN AUTOMOBILE

RELATED APPLICATIONS

Not applicable.

FIELD OF THE INVENTION

The present invention relates generally to the field of a track system capable of being installed on an automobile wheel.

BACKGROUND OF THE INVENTION

Those of us who live in areas where the winter climate brings snow, sleet and ice know all too well of the hazards associated with driving an automobile under these conditions. Inclement weather can cause roads and highways to become extremely slippery in literally a matter of minutes and without warning. As a result, thousands of people are injured or even killed in automobile accidents when they lose control of their vehicles due to a lack of traction.

While plowing the snow from road surfaces and applying salt or sand helps to make them safer, in most cases it is impossible to keep up with the weather and the roads are left in an unsafe condition. Additionally, many people become stuck in snow drifts and icy streets as well. Finally, these same problems occur on rutted roads, deep sand, or in extremely muddy conditions.

Accordingly, there exists a need for a means by which motor vehicles can be provided with increased traction in all types of poor driving conditions. The development of the track drive apparatus for a motor vehicle fulfills this need.

SUMMARY OF THE INVENTION

The principles of the present invention provide such a track system capable of being removably mounted to a wheel of an automobile. The track system generally includes a frame assembly, capable of encompassing a width of the automobile tire and a continuous track assembly, circumventing the track assembly and configured to be in contact with the tire. The track assembly rotates independently relative to the frame assembly and capable of concurrent rotation with the tire.

It is therefore an object of the present invention to provide such a frame assembly that includes a first side, having a first side first tubular member, a first side second tubular member, and a first side adjustment mechanism. The frame assembly also includes a second side, disposed parallel to the first side, further having a second side first tubular member, a second side second tubular member, and a second side adjustment mechanism. The frame assembly further includes a first idler wheel attached to second ends of the first side first tubular member and second side first tubular member and capable of independent rotation relative thereto, and a second idler wheel attached to second ends of the first side second tubular member and second side second tubular member and capable of independent rotation relative thereto. At least one (1) outer support stand is removably attached to the first side, capable of contacting a portion of the automobile to prevent the frame assembly from rotating concurrent with the tire, or a center support stand also removably attached to the first side, capable of contacting another portion of the automobile to prevent the frame assembly from rotating concurrent with the tire. The first side is configured to reside towards the automobile relative from the tire. The first and second idler wheels are configured to reside fore and aft of the tire.

It is a further object of the present invention to provide such an outer support stand to include an outer base plate, removably attached to any tubular member adjacent any idler wheel, an outer post, having a first end affixed to and extending away from a center top side of the outer base plate, and an outer top plate, having a center bottom side affixed to a second end of the outer post. The outer top plate is capable of contacting the portion of the automobile. In certain embodiments, there exists two (2) outer support stands, where a first outer support stand is removably attached to the first side first tubular member and a second outer support stand is removably attached to the first side second tubular member.

It is another object of the present invention to provide such a center support stand further including a center base plate, removably attached to the first side first tubular member and first side second tubular member and above the first adjustment mechanism, a center post, having a first end affixed to and extending away from a center top side of the center base plate, and a fork, having a center bottom side affixed to a second end of the center post. The fork is capable of contacting the other portion of the automobile.

It is still another object of the present invention to provide such a first idler wheel to include a first shaft, having distal ends attached to the second ends of the first side first tubular member and second side first tubular member and a first roller capable of independent rotation along the first shaft. Similarly, the second idler wheel includes a second shaft, having distal ends attached to the second ends of the first side second tubular member and second side second tubular member, and a second roller capable of independent rotation along the second shaft.

In certain embodiments, each tubular member is generally square. As such, these embodiments would comprise the first side adjustment mechanism and the second side adjustment mechanism each comprising an outer tube defining an outer tube cavity, an inner tube defining an inner tube cavity which is moveably secured within the outer tube cavity; a threaded rod secured within the inner tube cavity and projecting from the inner tube and the outer tube and a cap which is secured to an end of a projecting portion of the threaded rod. The idler wheels are secured to an inner side of the outer tube. A first rotation of the cap loosens the frame assembly a second rotation of the cap, opposite the first rotation, tightens the frame assembly.

It is yet another object of the present invention to provide such a track assembly to further include a plurality of rods, each having a pair of upturned distal ends, and a continuous and flexible belt attached to a first side of each of the plurality of rods. The track assembly is routed about the tire, first idler wheel and second idler wheel such that each of the plurality of rods is disposed generally parallel with the idler wheels. It is generally preferred that the upturned distal ends are at approximately a ninety-five degree (95°) angle. Certain embodiments include a continuous track assembly, where other embodiments provide for a plurality of individual segments, each having a portion of a flexible belt and an individual rod as described above. Each segment is linked together to form a continuous track assembly.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a perspective view of the track drive apparatus for a motor vehicle 10, shown in an installed state on a motor vehicle 80, according to the preferred embodiment of the present invention;

FIG. 3B is an interior perspective view of the track drive apparatus for a motor vehicle 10, shown in an installed state, according to an alternate embodiment of the present invention;

FIG. 5b is a sectional view of the track drive apparatus for a motor vehicle 10, as seen along a line II-II, as shown in FIG. 3b, according to an alternate embodiment of the present invention;

Figure 1:
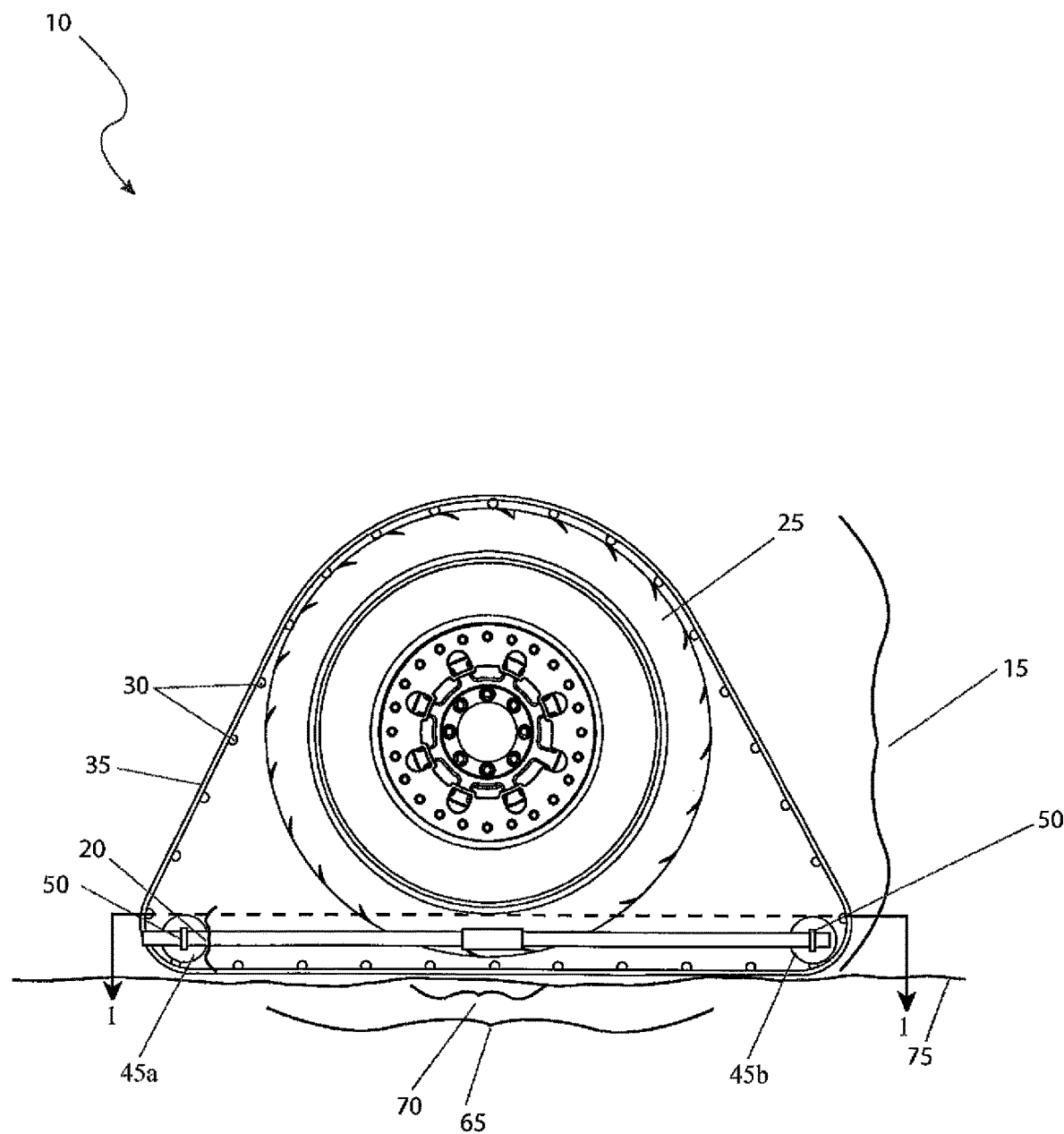
FIG. 1 is a front view of the track drive apparatus for a motor vehicle 10, according to the preferred embodiment of the present invention.

DESCRIPTIVE KEY 10 track drive apparatus
15 track system
20 frame system
25 tire
30 multiple traction rod
35 interconnecting belt material
45 idler pulley wheel
50 axle shaft
60 tire diameter "td"
65 apparatus contact area
70 tire contact area
75 grade
80 automobile
85 drive wheel
90 drive axle
95 differential
100 leaf spring
105 shock absorber
110 center support stand
115 outer support stand
120 outward side
125 inward side
130 length adjustment travel path "l"
135 base plate
140a center post
140b outer post
145a fork
145b outer top plate
150 "U"-bolt
155 upturned end
160 angle "e"
165 cup-like retention area
200 outer tube
205 inner tube
210 cap
215 threaded rod
220 first nut
225 rolled cold pin
230 second nut
235 third nut

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a front view of the track drive apparatus 10 for an automobile 80, according to the preferred embodiment of the present invention is disclosed. The track drive apparatus (herein also described as the "apparatus") 10, includes two (2) primary components: a track system 15 and a frame system 20. The track system 15 is supported around the perimeter of a tire 25, while the frame system 20 is positioned around the bottom of the tire 25. The track system 15 includes multiple traction rods 30 and interconnecting belt material 35. Further description of the track system 15 as well as the multiple traction rods 30 and interconnecting belt material 35 will be provided herein below.

The frame system 20 includes interconnecting tubular members 200, 205 located on each an outward side 120 and an inward side 125 and mounted in a path parallel to the travel experienced by the tire 25 with two (2) idler pulley wheels 45 mounted fore and aft as shown. Each idler pulley wheel 45 has an axle shaft 50 extending outwardly therefrom. The axle shafts 50 of the idler pulley wheels 45 are connected to the interconnecting tubular members 200, 205 by use of spring clips. The inner tube 205 is adjustably positionable within and without the outer tube 200 to adjust the overall length of the frame system 20 to match a tire diameter "td" 60. As such, there are two (2) outer tubes 200, two (2) inner tubes 205, and four (4) axle shafts 50. It is noted that the apparatus contact area 65 provides a much higher value than the tire contact area 70 alone with grade 75 and thus improves traction of an automobile 80 equipped with the apparatus 10.

Referring next to FIG. 2, a perspective view of the apparatus 10, shown in an installed state on an automobile 80, according to the preferred embodiment of the present invention is depicted. It is noted that the apparatus 10 is installed on the drive wheels 85 of an automobile 80. As such, the apparatus 10 would be installed in pairs (only one (1) of which is shown in FIG. 2 due to illustrative limitations) on the drive wheels 85. As such, the apparatus 10 would be installed on the rear wheels of a rear wheel drive automobile 80 (as shown), the front wheels of a front wheel drive automobile 80, or all four (4) wheels of a four-wheel drive automobile 80. The use of the apparatus 10 on any specific location or quantity of drive wheels 85 is not intended to be a limiting factor of the present invention. The automobile 80 is depicted as a pickup truck for illustrative purposes only. The use of the apparatus 10 on any specific type of automobile 80 is not intended to be a limiting factor of the present invention. It is noted that the track system 15, the frame system 20 and the idler pulley wheels 45 are visible on the exterior of the automobile 80, but present a discrete, low profile appearance that does not extend beyond the exterior surfaces of said automobile 80.

Figure 3A:
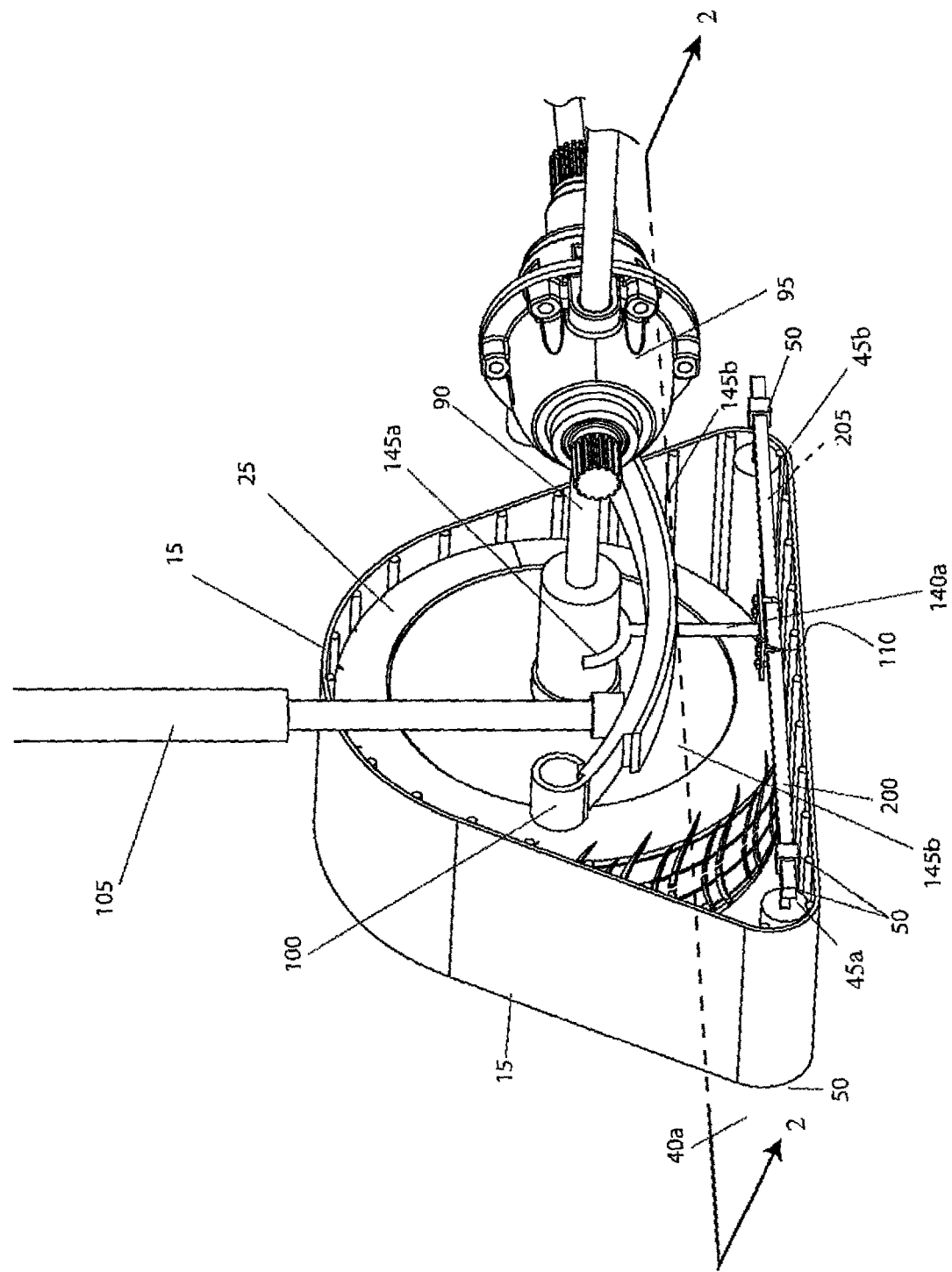
FIG. 3a is an interior perspective view of the track drive apparatus for a motor vehicle 10, shown in an installed state, according to the preferred embodiment of the present invention.

Referring now to FIGS. 3a and 3b, an interior perspective view of the apparatus 10, shown in an installed state, according to the preferred and alternate embodiment of the present invention is shown. This view provides disclosure of many standard components provided on a typical automobile 80 (as shown in FIG. 2), including but not limited to: a drive axle 90, a differential 95, a leaf spring 100, and a shock absorber 105. The track system 15 is shown wrapped around the tire 25 in its deployed configuration, and supported by the idler pulley wheels 45 (only one (1) of which is shown due to illustrative limitations). The apparatus 10 is maintained in position by the use of either a center "U"-shaped support stand 110 or two (2) outer support stands 115. It is intended that only the center support stand 110 or the outer support stands 115 would be utilized on any specific automobile 80. Both are shown here for illustrative purposes only. Further description of the center support stand 110 and the outer support stands 115 will be provided herein below.

It is envisioned that the coupling method provided by either the center support stand 110 or the outer support stands 115 will allow use of the apparatus 10 on almost any type of automobile 80. It is noted that neither the apparatus 10, nor its center support stand 110 or outer support stands 115, is physically fastened to the automobile 80 (as shown in FIG. 2). This allows for multiple benefits. First, the apparatus 10 can be utilized with a wide range of automobile 80 types. Second, it can be applied to the tire 25 in a fast manner without the use of tools. Finally, it does not require any modification to the automobile 80 (as shown in FIG. 2) such as bolting, screwing, welding, or the like, and as such, can be easily removed when no longer needed without leaving any tell-tale marks behind.

Figure 4:
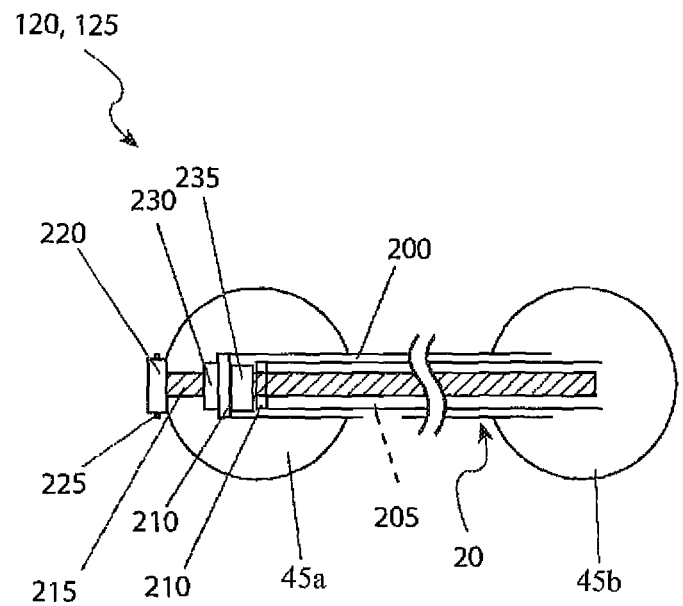
FIG. 4 is a detailed view of the frame system 20 as used with the track drive apparatus for a motor vehicle 10, according to the preferred embodiment of the present invention.

Referring next to FIG. 4, a detailed view of the frame system 20 as used with the track drive apparatus for a motor vehicle 10, according to the preferred embodiment of the present invention is disclosed. This view provides clearer definition of the frame system 20. It is noted that the view provided is a mirror image of both an outward side 120 and an inward side 125. Both the outward side 120 and inward side 125 includes an outer tube 200 and an inner tube 205. The inner tube 205 is envisioned to be one (1) inch outer diameter, while the outer tube 200 is envisioned to be one (1) inch inner diameter, thus allowing the inner tube 205 to slide within the outer tube 200 as shown. Both the outer tube 200 and the inner tube 205 have a cap 210 at one (1) end as shown. The cap 210 at the end of the outer tube 200 is drilled out to allow a threaded rod 215 to slide freely. The cap 210 at the end of the inner tube 205 is threaded to retain the threaded rod 215. A first nut 220 is fixed in place on the end of the threaded rod 215 by a rolled cold pin 225. A second nut 230 functions as a lock nut which prevents the threaded rod 215 from rotation once tension has been applied to the frame system 20. A third nut 235 is welded in place upon the threaded rod 215. As such, by tightening or loosening the rolled cold pin 225, tension can be applied or removed to the frame system 20 respectively. It is noted that the frame system 20 on the inward side 125 has axle shafts welded to the distal end on the inside section of each tube upon which the idler pulley wheels 45 rotate. The frame system 20 on the outward side 120 has a short pipe welded to the outward end of the top side of each outer tube 200. This permits the outerward end of the axle shafts 50 to attach through the outer tube 200. Fasteners such as spring clips then secure the frame system 20 to the axle shafts 50 of the idler pulley wheels 45.

Figure 5A:
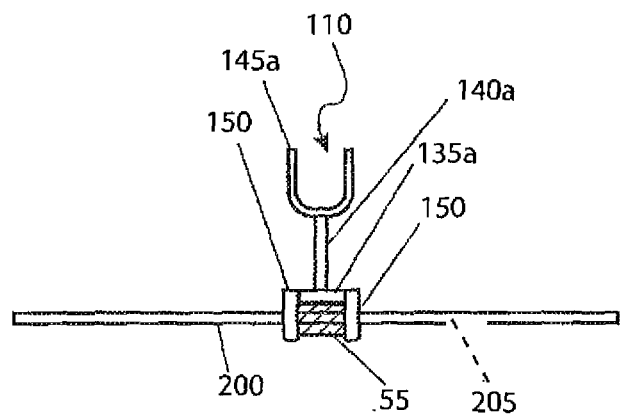
FIG. 5a is a sectional view of the track drive apparatus for a motor vehicle 10, as seen along a line II-II, as shown in FIG. 3a, according to the preferred embodiment of the present invention.

Referring now to FIGS. 5a and 5b, a sectional view of the apparatus 10, as seen along a line II-II, as shown in FIGS. 3a and 3b, according to the preferred and alternate embodiment of the present invention is depicted. As before, both the center support stand 110 and the outer support stand 115 are shown for illustrative purposes, but it is understood that only the center support stand 110 or the outer support stand 115 would be required for any one (1) specific application of the apparatus 10. The center support stand 110 and each outer support stand 115 are provided on the inward side 125 of the apparatus 10. Each outer support stand 115 includes an outer base plate 135b, an outer post 140b, and an outer top plate 145b in a welded configuration. The outer post 140b is affixed to a center location of facing sides of the outer base plate 135b and outer top plate 145b. The outer top plate 145b is capable of physically contacting the leaf springs 100 (as shown in FIG. 3) or frame system to prevents the apparatus 10 from rotating around the tire 25 (as shown in FIG. 1). A center base plate 135a for the center support stand 110 is secured to the outer tube 200. A generally "U"-shaped fork 145a capable of cradling a cylindrical body is supported by a center post 140a, which is affixed to a center location of facing sides of the center base plate 135a and fork 145a. The base plates 135a, 135b, in any of the situations described above, are secured to a respective outer tube 200 with the use of "U"-bolts 150.

Figure 6:
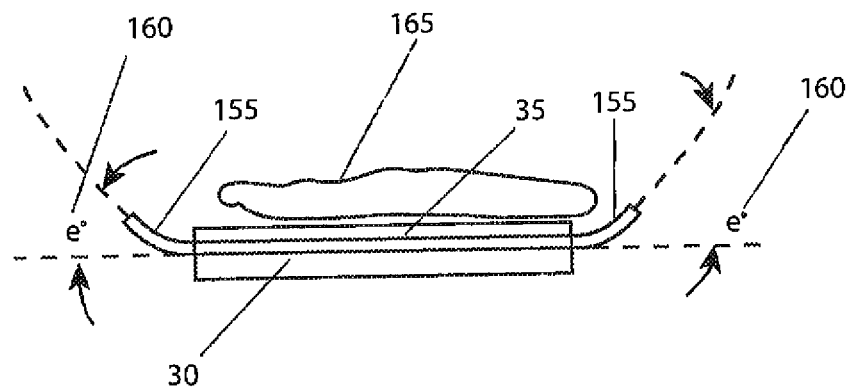
FIG. 6 is a sectional view of the track drive apparatus for a motor vehicle 10, as seen along a line III-III, as shown in FIG. 2, according to the preferred embodiment of the present invention; and, FIG. 7 is a sectional view of the track drive apparatus for a motor vehicle 10, as seen along a line IV-IV, as shown in FIG. 2, according to the preferred embodiment of the present invention.

Referring next to FIG. 6, a sectional view of the apparatus 10, as seen along a line III-III, as shown in FIG. 2, according to the preferred embodiment of the present invention is shown. Each multiple traction rod 30 is provided with a pair of upturned distal ends 155 positioned at an angle "e" 160, envisioned to be approximately ninety-five degrees (95°). This forms a cup-like retention area 165 to aid in the retention and linear tracking of the tire 25 (as shown in FIG. 1). The multiple traction rods 30 are interconnected with the flexible interconnecting belt material 35, envisioned to be reinforced rubber, similar to that used in the construction of tire 25 (as shown in FIG. 1).

Figure 7:
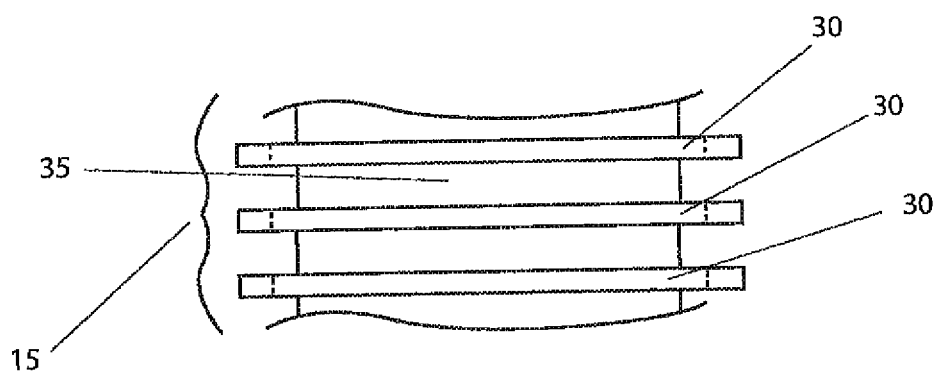

Referring finally to FIG. 7, a sectional view of the apparatus 10, as seen along a line IV-IV, as shown in FIG. 2, according to the preferred embodiment of the present invention is disclosed. This view provides clarification of the interconnecting belt material 35 used to connect the multiple traction rods 30 into its belt or track configuration. It is envisioned that the track system 15 may be constructed in a continuous molding or vulcanizing process, or by the use of mechanical insertion of the multiple traction rods 30 into individual segments of the interconnecting belt material 35 to form a linked mechanism. The exact method of construction used with the track system 15 is not intended to be a limiting factor of the present invention.

The preferred embodiment of the present invention can be utilized by the common user in a simple and effortless manner with little or no training. It is envisioned that the apparatus 10 would be constructed in general accordance with FIG. 1 through FIG. 7. The user would procure the apparatus 10 through normal procurement channels. It is envisioned that different makes and models of the apparatus 10 would be made available to fit all makes and models of tire 25. Particular attention would be paid to vehicle configuration, tire diameter "td" 60, tire width, and the like.

After procurement and prior to utilization, the apparatus 10 would be prepared in the following manner: the frame system 20 would be positioned around the lower edge of the drive wheels 85; the frame system 20 adjusted in length by adjusting the inner tube 205 relative to the outer tube 200 to match the tire diameter "td" 60; the track system 15 engaged upon the tire 25; and the center support stand 110 engaged within the drive axle 90 or the outer support stand 115 engaged under the leaf springs 100 or the frame of the automobile 80.

During utilization of the apparatus 10, the following procedure would be initiated: the automobile 80 would be driven in a normal manner, albeit with increased traction, and reduced tendency to slide side to side. The automobile 80 can be accelerated, braked, and turned with increased confidence when driving on snow, ice, mud, loose grade or the like. It may also be driven forward or backwards.

After use of the apparatus 10, it is simply removed following the reverse of the above process and stored until needed again, whereupon the process is repeated in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A track system capable of being removably mounted to a wheel of an automobile, comprising:
   a frame assembly capable of encompassing a width of an automobile tire; and
   a continuous frame assembly circumventing said frame assembly and configured to be in contact with said tire;
   wherein said frame assembly rotates independently relative to said frame assembly; and
   wherein said frame assembly is capable of concurrent rotation with said tire;
   wherein said frame assembly further comprises:
   a first side, comprising:
      a first side first tubular member;
      a first side second tubular member; and
      a first side adjustment mechanism;
   a second side disposed parallel to said first side, further comprising:
      a second side first tubular member;
      a second side second tubular member; and
      a second side adjustment mechanism;
   a first idler wheel attached to second ends of said first side first tubular member and said second side first tubular member;
   a second idler wheel attached to second ends of said first side second tubular member and said second side second tubular member; and
   at least one outer support stand removably attached to said first side, capable of contacting a portion of said automobile to prevent said frame assembly from rotating concurrent with said tire;
   wherein said first side is configured to reside towards said automobile relative from said tire;
   wherein said first idler wheel and said second idler wheel are configured to reside fore and aft of said tire;
   wherein said first idler wheel rotates independently from said first side first tubular member and said second side first tubular member; and
   wherein said second idler wheel rotates independently from said first side second tubular member and said second side second tubular member.

2. The system of claim 1, wherein the at least one outer support stand further comprises two outer support stands, each having:
   an outer base plate removably attached to any tubular member adjacent any idler wheel;
   an outer post having a first end affixed to and extending away from a center top side of said outer base plate; and
   an outer top plate having a center bottom side affixed to a second end of said outer post;
   wherein said outer top plate is capable of contacting said portion of said automobile.

3. The system of claim 2, wherein said frame assembly further comprises:
   a plurality of rods each having a pair of upturned distal ends; and
   a continuous and flexible belt attached to a first side of each of said plurality of rods;
   wherein said frame assembly is capable of being routed about said tire, said first idler wheel and said second idler wheel such that each of said plurality of rods is generally parallel with said idler wheels.

4. The system of claim 1, wherein the at least one outer support stand further comprising first and second support stands further comprising:
   a first outer support stand removably attached to said first side first tubular member; and
   a second outer support stand removably attached to said first side second tubular member.

5. The system of claim 1, wherein the at least one outer support stand is a center support stand further comprising a center support stand removably attached to said first side, capable of contacting another portion of said automobile to prevent said frame assembly from rotating concurrent with said tire, comprising:
   a center base plate removably attached to said first side first tubular member and said first side second tubular member and above said first adjustment mechanism;
   a center post having a first end affixed to and extending away from a center top side of said center base plate; and
   a fork having a center bottom side affixed to a second end of said center post.

6. The system of claim 1, wherein:
said first idler wheel, comprises:
a first shaft having distal ends attached to said second ends of said first side first tubular member and said second side first tubular member; and
said second idler wheel comprises:
a second shaft, having distal ends attached to said second ends of said first side second tubular member and said second side second tubular member.

7. The system of claim 1, wherein each tubular member is generally square.

8. The system of claim 1, wherein said first side adjustment mechanism and said second side adjustment mechanism each comprises:
an outer tube defining an outer tube cavity;
an inner tube defining an inner tube cavity moveably secured within said outer tube cavity;
a threaded rod secured within said inner tube cavity and projecting from said inner tube and said outer tube; and
a cap secured to an end of a projecting portion of said threaded rod;
wherein said idler wheels are secured to an inner side of said outer tube;
wherein a first rotation of said cap loosens said frame assembly; and
wherein a second rotation of said cap, opposite said first rotation, tightens said frame assembly.

9. A track system capable of being removably mounted to a wheel of an automobile, comprising:
a frame assembly, capable of encompassing a width of an automobile tire; and
a frame assembly, circumventing said frame assembly and configured to be in contact with said tire;
wherein said frame assembly rotates independently relative to said frame assembly; and
wherein said frame assembly is capable of concurrent rotation with said tire;
wherein said frame assembly further comprises:
a first side, comprising:
a first side first tubular member;
a first side second tubular member; and
a first side adjustment mechanism;
a second side, disposed parallel to said first side, further comprising:
a second side first tubular member;
a second side second tubular member; and
a second side adjustment mechanism;
a first idler wheel attached to second ends of said first side first tubular member and said second side first tubular member;
a second idler wheel attached to second ends of said first side second tubular member and said second side second tubular member; and a center support stand removably attached to said first side, capable of contacting another portion of said automobile to prevent said frame assembly from rotating concurrent with said tire;
wherein said first side is configured to reside towards said automobile relative from said tire;
wherein said first idler wheel and said second idler wheel are configured to reside fore and aft of said tire;
wherein said first idler wheel rotates independently from said first side first tubular member and said second side first tubular member; and
wherein said second idler wheel rotates independently from said first side second tubular member and said second side second tubular member.

10. The system of claim 9, wherein the center support stand further comprises:
a center base plate removably attached to said first side first tubular member and said first side second tubular member and above said first adjustment mechanism;
a center post having a first end affixed to and extending away from a center top side of said center base plate; and
a fork having a center bottom side affixed to a second end of said center post;
wherein said fork is capable of contacting said another portion of said automobile.

11. The system of claim 9, wherein:
said first idler wheel, comprises:
a first shaft, having distal ends attached to said second ends of said first side first tubular member and said second side first tubular member; and
a second shaft having distal ends attached to said second ends of said first side second tubular member and said second side second tubular member; and.

12. The system of claim 9, wherein each tubular member is generally square.

13. The system of claim 9, wherein said first side adjustment mechanism and said second side adjustment mechanism each comprise:
an outer tube defining an outer tube cavity;
an inner tube defining an inner tube cavity moveably secured within said outer tube cavity;
a threaded rod secured within said inner tube cavity and projecting from said inner tube and said outer tube; and
a cap secured to an end of a projecting portion of said threaded rod;
wherein said idler wheels are secured to an inner side of said outer tube;
wherein a first rotation of said cap loosens said frame assembly; and
wherein a second rotation of said cap, opposite said first rotation, tightens said frame assembly.

* * * * *